United States Patent [19]
Van Gerwen

[11] 3,723,880
[45] Mar. 27, 1973

[54] SYSTEM FOR THE TRANSMISSION OF MULTILEVEL DATA SIGNALS

[75] Inventor: Petrus Josephus Van Gerwen, Emmasingel, Eindhoven, Netherlands

[73] Assignee: U.S. Philips Corporation, New York, N.Y.

[22] Filed: Feb. 1, 1971

[21] Appl. No.: 111,378

[30] Foreign Application Priority Data

Feb. 12, 1970 Netherlands ........................7001968

[52] U.S. Cl. ..................................325/38 A, 325/43
[51] Int. Cl. ..............................................H04b 1/20
[58] Field of Search.....325/38 A, 42, 43; 178/68, 69, 178/DIG. 3; 340/347 DD

[56] References Cited

UNITED STATES PATENTS

| | | | |
|---|---|---|---|
| 3,421,146 | 1/1969 | Fegus et al. | 325/42 |
| 3,505,644 | 4/1970 | Breant | 325/38 R |
| 3,601,702 | 8/1971 | Lende | 325/38 A |
| 3,590,386 | 6/1971 | Tisi et al. | 325/38 R |

*Primary Examiner*—Robert L. Griffin
*Assistant Examiner*—Barry Leibowitz
*Attorney*—Frank R. Trifari

[57] ABSTRACT

A system for the transmission of multilevel data signals in which a multilevel coder incorporated in the transmitter includes a pulse group analyzer which is provided with m output lines which analyses pulse groups each containing *k* binary pulses of the binary information signals, and applies a pulse series characteristic of the analyzed pulse group to each output line which pulses are applied through a cascade arrangement of amplitude control device and pseudo-ternary code converter incorporated in each output line to a combination device from whose output a $2m + 1$ level signal is derived at a frequency spectrum in which spectral zeros occur at prescribed positions. In the receiver this signal is applied to a cascade arrangement of a full-wave rectifier and a level separator including m output lines which are applied to a pulse group shaper with which the original information signals are uniformly recovered.

15 Claims, 15 Drawing Figures

Patented March 27, 1973

3,723,880

11 Sheets-Sheet 1

*INVENTOR.*

PETRUS J. VAN GERWEN

*BY* [signature]

AGENT

*INVENTOR.*

PETRUS J. VAN GERWEN

*BY* [signature]

AGENT

Figure 1:
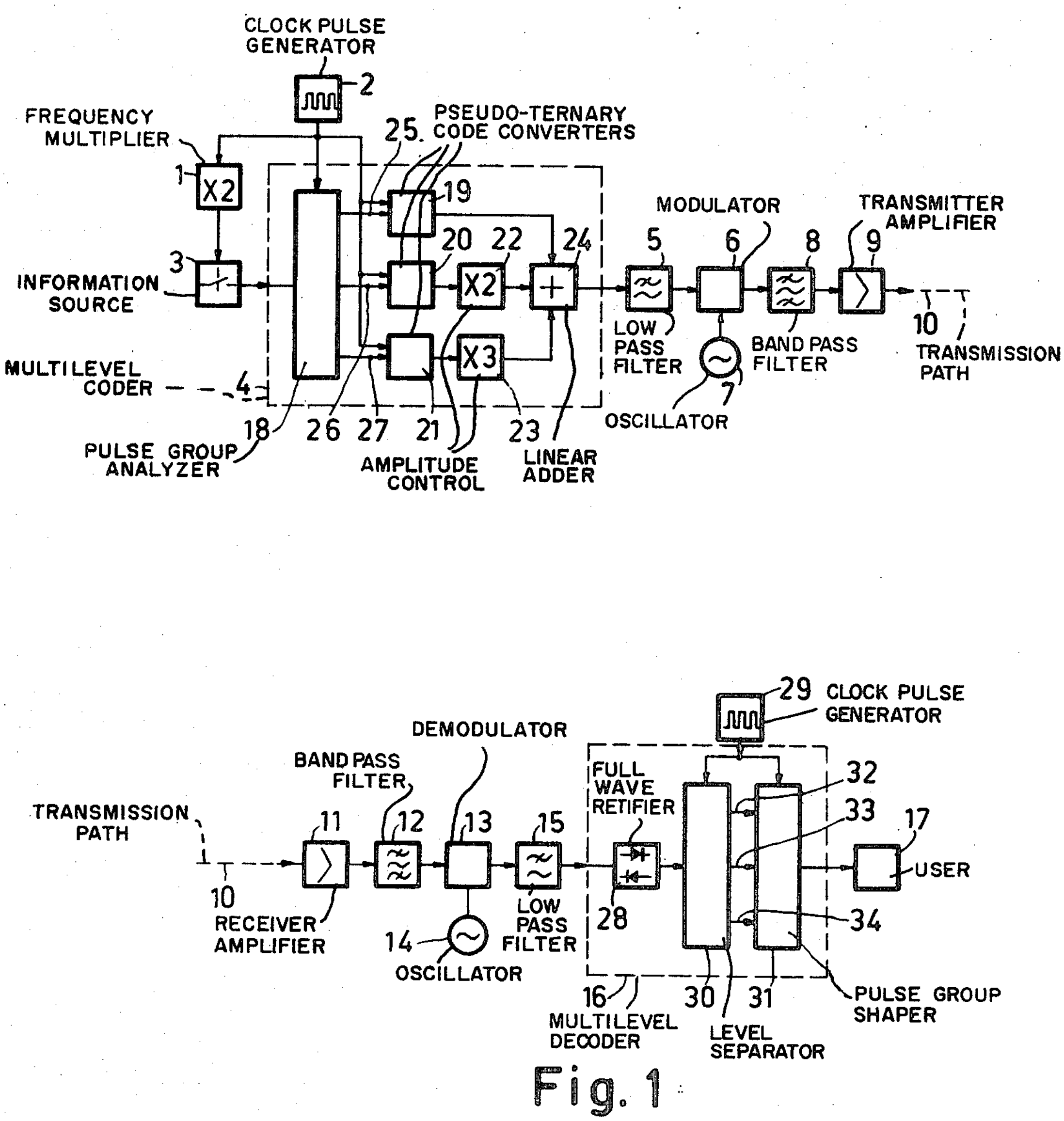

INVENTOR.
PETRUS J. VAN GERWEN
BY
AGENT

INVENTOR.
PETRUS J. VAN GERWEN
BY
AGENT

*INVENTOR.*
PETRUS J. VAN GERWEN

BY [signature]
AGENT

Patented March 27, 1973 3,723,880

11 Sheets-Sheet 6

INVENTOR.
PETRUS J. VAN GERWEN
BY [signature]
AGENT

*INVENTOR.*
PETRUS J. VAN GERWEN
*BY*
Frank R. Trifari
AGENT

*INVENTOR.*
PETRUS J. VAN GERWEN
*BY* [signature]
AGENT

INVENTOR.
PETRUS J. VAN GERWEN
BY
AGENT

INVENTOR.
PETRUS J. VAN GERWEN
BY Frank R. [signature]
AGENT

INVENTOR.
PETRUS J. VAN GERWEN
BY
AGENT

SYSTEM FOR THE TRANSMISSION OF MULTILEVEL DATA SIGNALS

The invention relates to a transmission system and to transmitters and receivers for use therewith for the transmission of signals in a prescribed frequency band comprising a transmitter including a multilevel coder and means applying to said multilevel coder a series of binary input pulses occurring at instants coinciding with a series of equidistant clock pulses, and having the logical values "0" or "1," said series of binary input pulses being converted by said multilevel coder into a series of multilevel pulses each having any one of at least five different amplitude levels, said multilevel pulse series having a frequency spectrum with spectral zeros occurring at prescribed positions, and a receiver including a multilevel decoder and means applying the received multilevel pulse series to said multilevel decoder for converting said multilevel pulse series into a series of binary pulses.

Compared with systems for the transmission of binary pulse series, such transmission systems adapted for the transmission of multilevel pulse series have the important advantage that the rate of information can be increased considerably in the prescribed frequency band, for example, by a factor of 2. However, as a result of the larger number of amplitude levels to be recognized, special attention is to be paid to the construction of such transmission systems, because the pulse-recognition capability is reduced and the sensitivity to interference is increased.

An object of the invention is to provide a novel conception of a transmission system of the type described in the preamble and of transmitters and receivers for use therewith while simultaneously realizing the following advantages:

1. There is a uniform relationship between the binary pulse series and the absolute value of the amplitude level of the multilevel pulse series;

2. Maximum simplification of the synchronization between the multilevel coder in the transmitter and the multilevel decoder in the receiver is achieved, particularly the synchronization is limited to the clock synchronization. No complicated synchronization steps are required such as, for example, group synchronization.

3. There is a reduction in interference sensitivity.

4. The transmitter and receiver may be built up from digital circuits and are therefore suitable for integration in a semiconductor body.

5. The transmission is particularly suitable for transmission of multilevel pulse signals by means of single sideband modulation.

The transmission system according to the invention is characterized in that the multilevel coder at the transmitter end includes a pulse group analyzer controlled by a clock pulse generator and having $m$ parallel arranged output circuits connected to a linear combination device to produce a series of multilevel pulses. Each of the pulses may assume any of $2m+1$ amplitude levels. The output circuits being respectively provided with mutually equal pseudo-ternary code converters and $m-1$ output circuits being respectively provided with an amplitude control device arranged in cascade with the relevant pseudo-ternary code converter. The pulse group analyzer being arranged for analyzing pulse groups consisting of $k$ successively applied binary input pulses. Applied to each one of said $m$ parallel arranged output circuits is a separate series of binary output pulses having the logical values "0" or "1". The separate series characterizing the analyzed pulse groups are each composed of a succession of the logical values "0" and "1," such that at each instant, one and only one output pulse of the analyzer has the logical value "1". The number of pulses of each characterizing pulse series is smaller than the number of pulses ($k$) of a pulse group, while the multilevel decoder at the receiver end comprises a cascade arrangement of a rectifier and a level separator. The cascade arrangement has m parallel arranged output terminals connected to the input terminals of a pulse group shaper. Both the level separator and said pulse group shaper are controlled by a local clock pulse generator. The cascade arrangement applies a separate series of binary pulses having the logical values "0" or "1" to each of the input terminals of said pulse group shaper. The series characterizing the different amplitude levels of the multilevel signal are converted by said pulse group shaper into successive pulse groups of k binary pulses, each corresponding to an analyzed pulse group, whereby the pulses of successive groups form the originally applied input pulse series.

Figure 2:
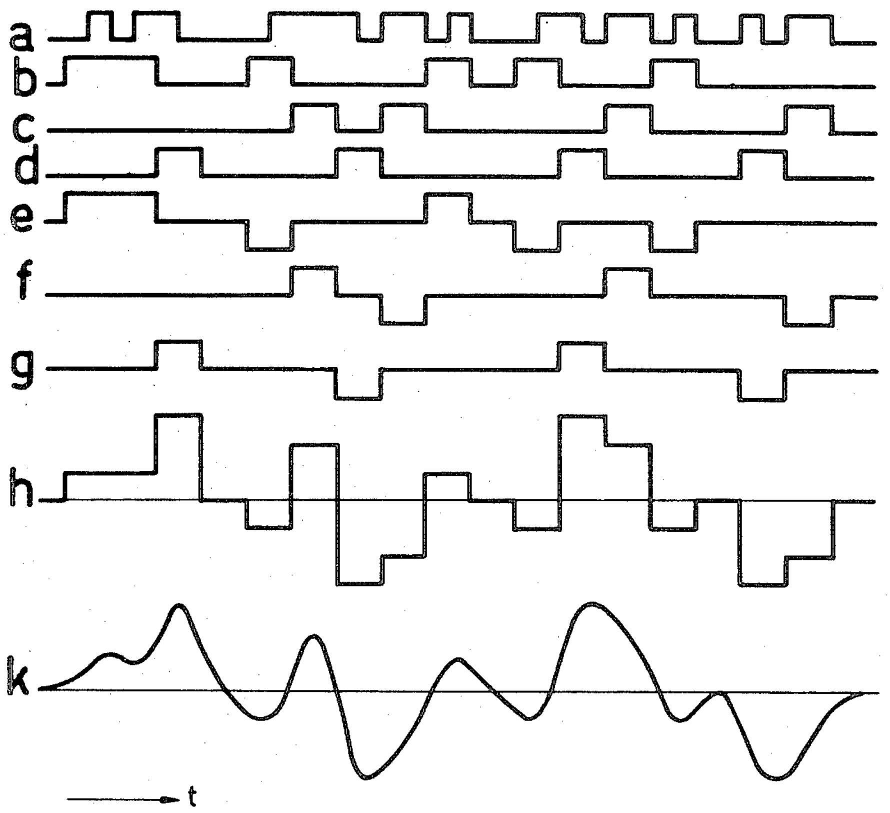
Figure 3:
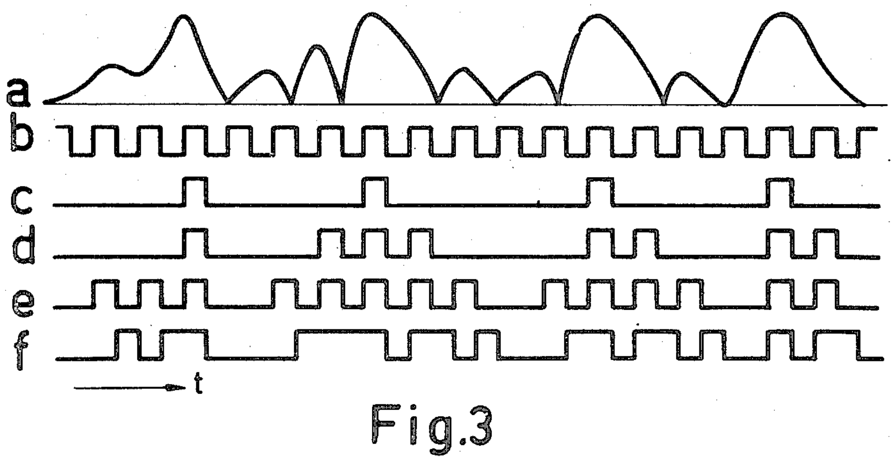
Figure 4:
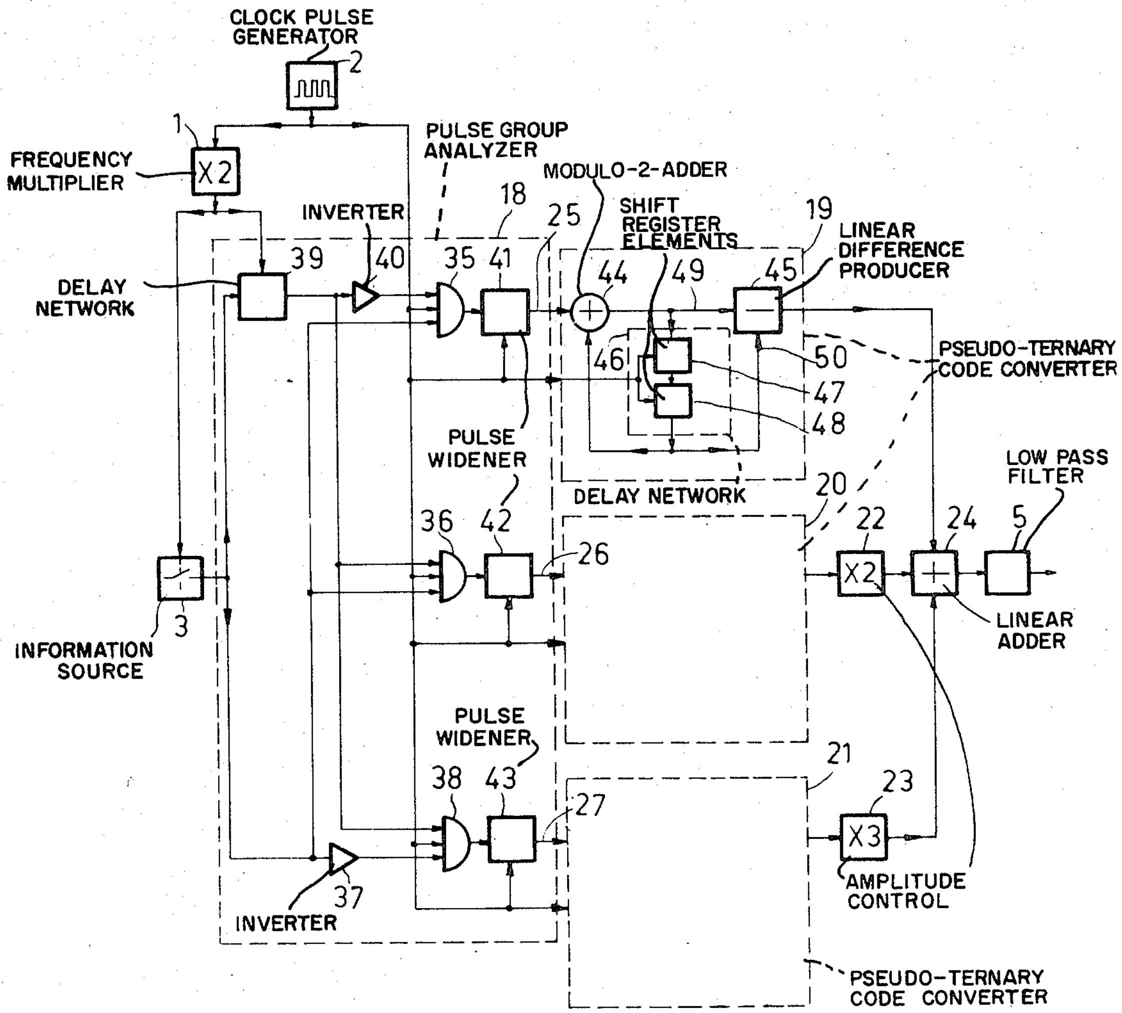
Figures 5, 6:
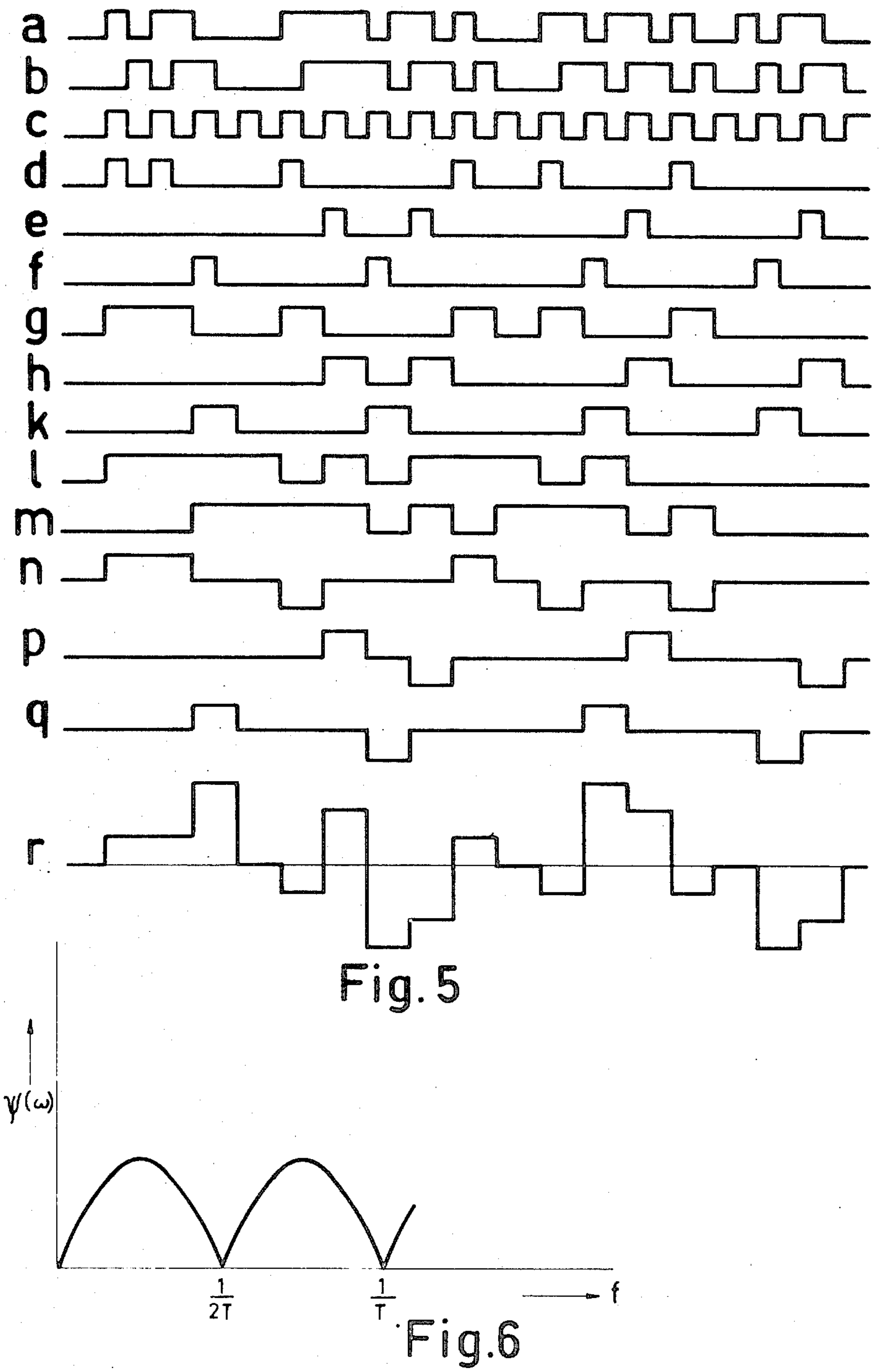
Figure 7:
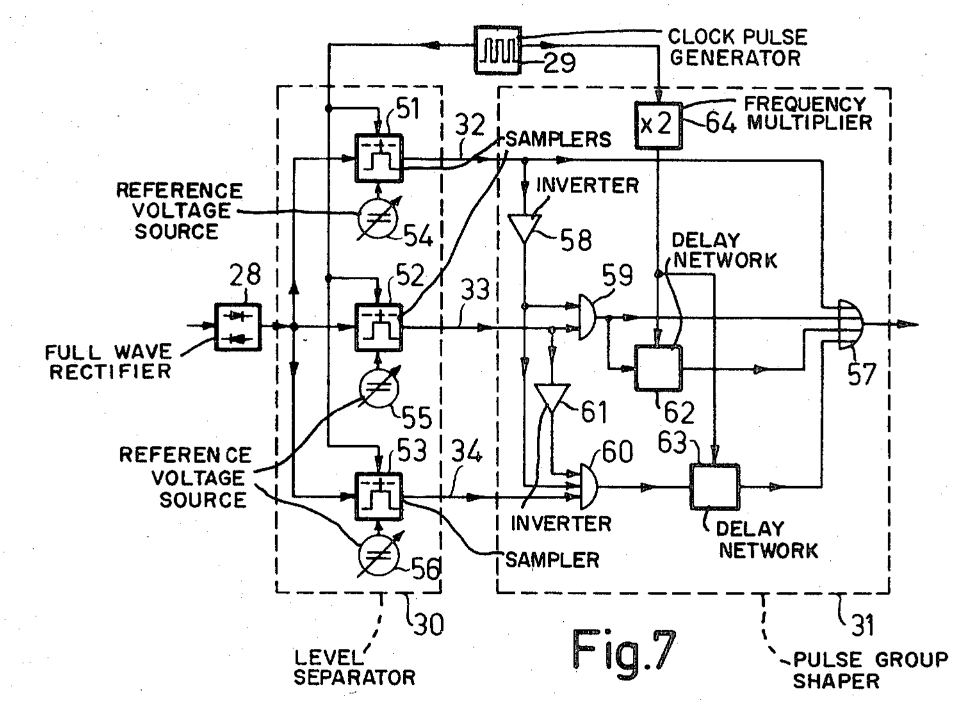
Figure 8:
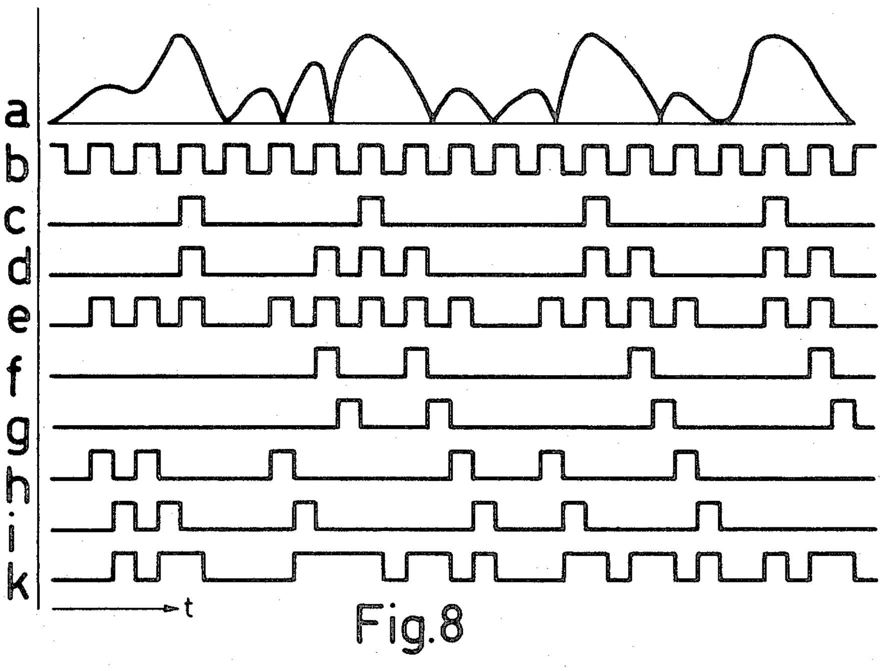
Figure 9:
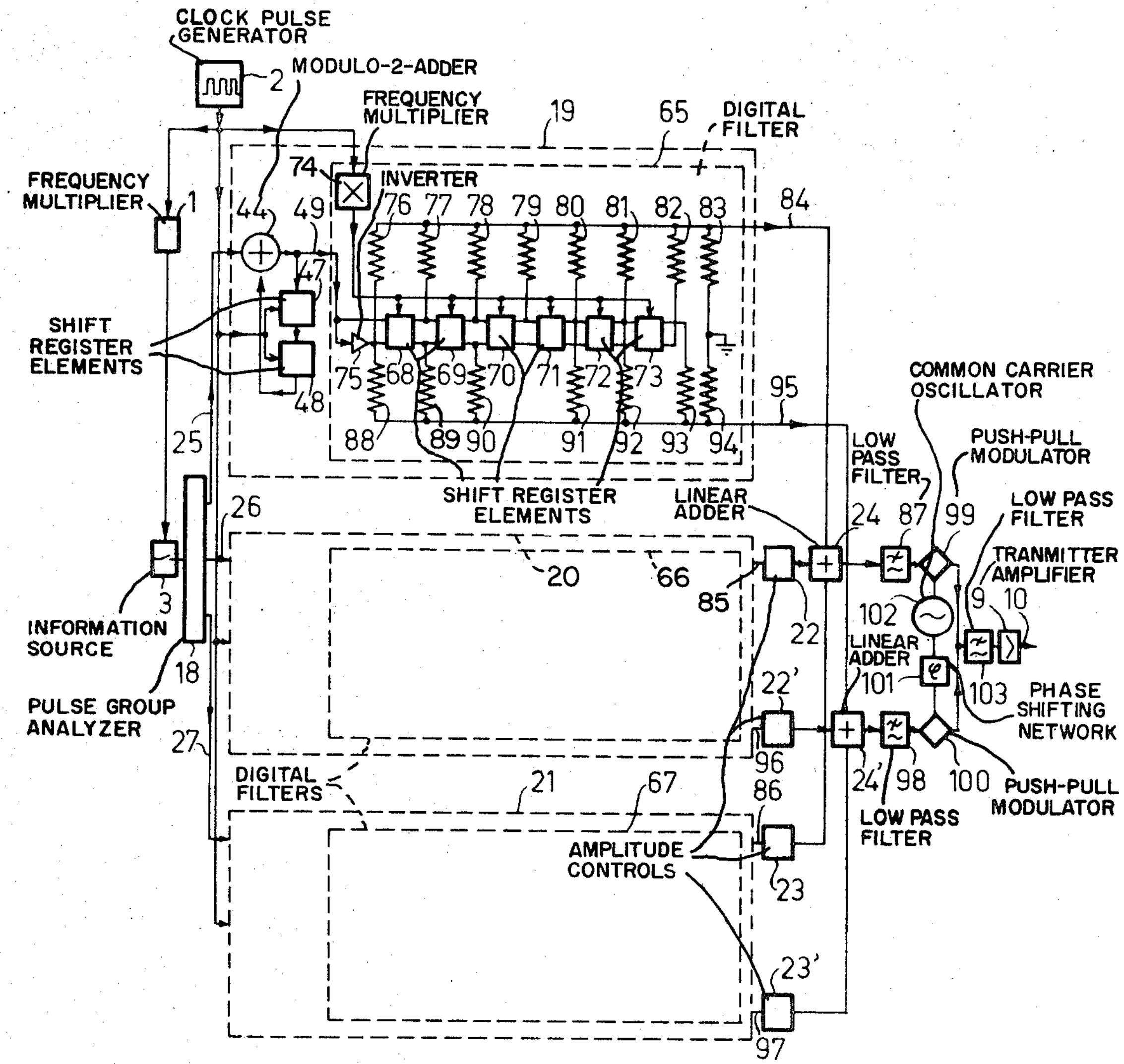
Figure 10:
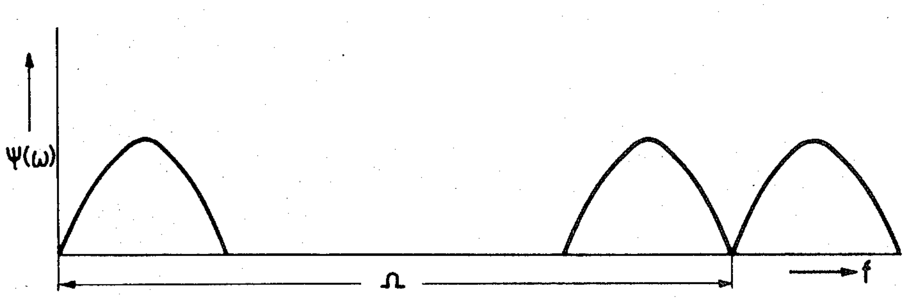
Figure 11:
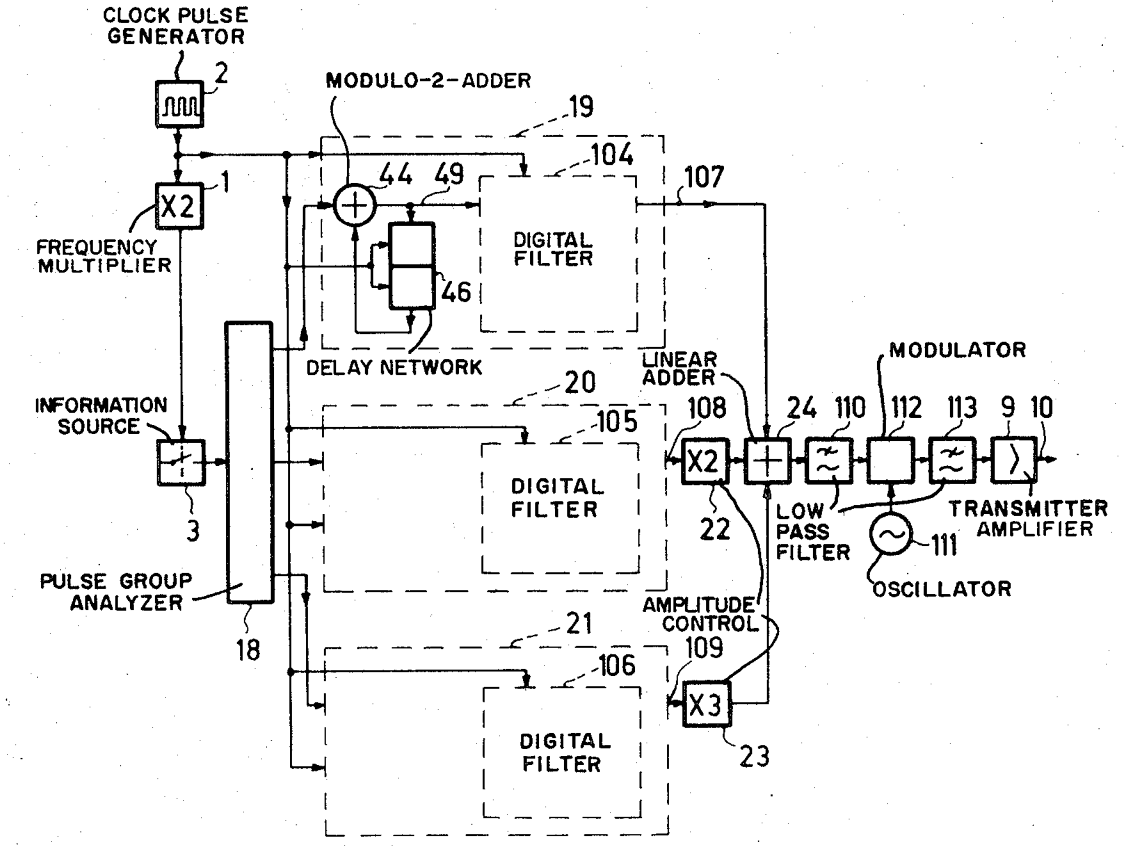
Figure 12:
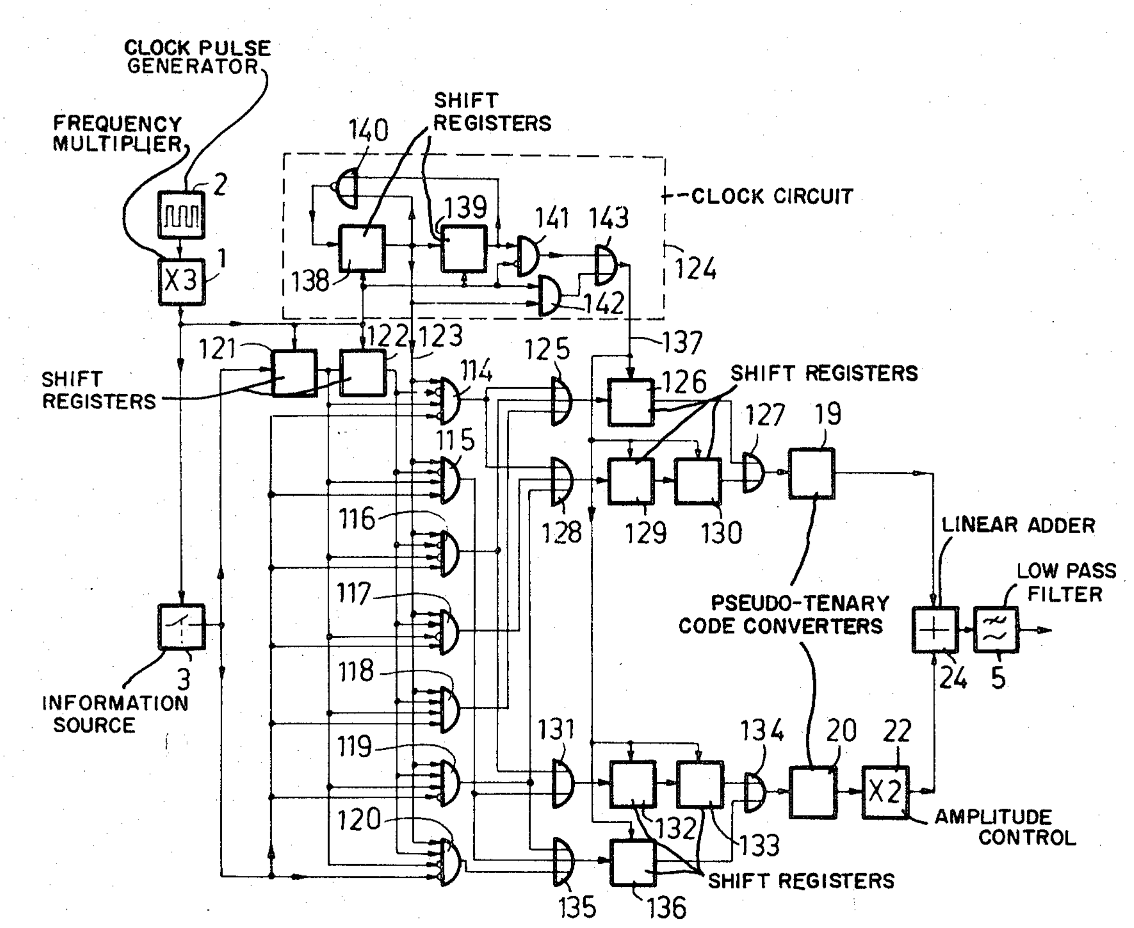
Figure 13:
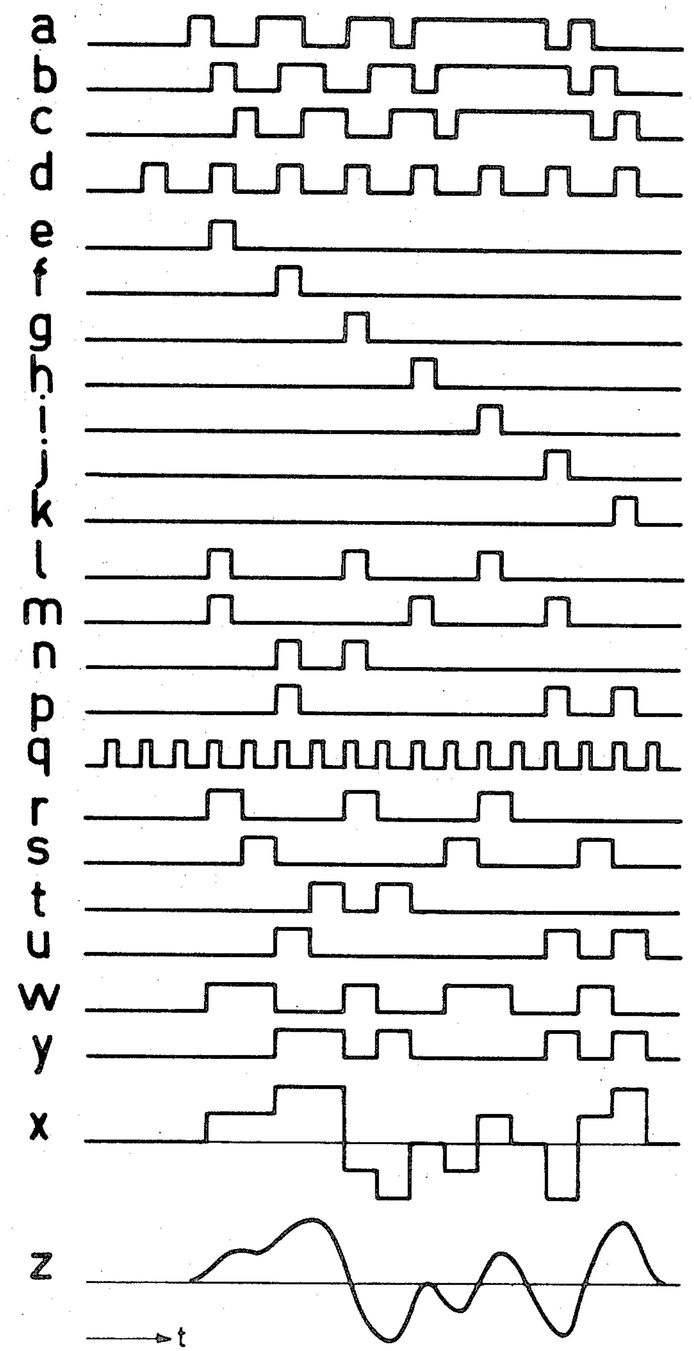
Figure 14:
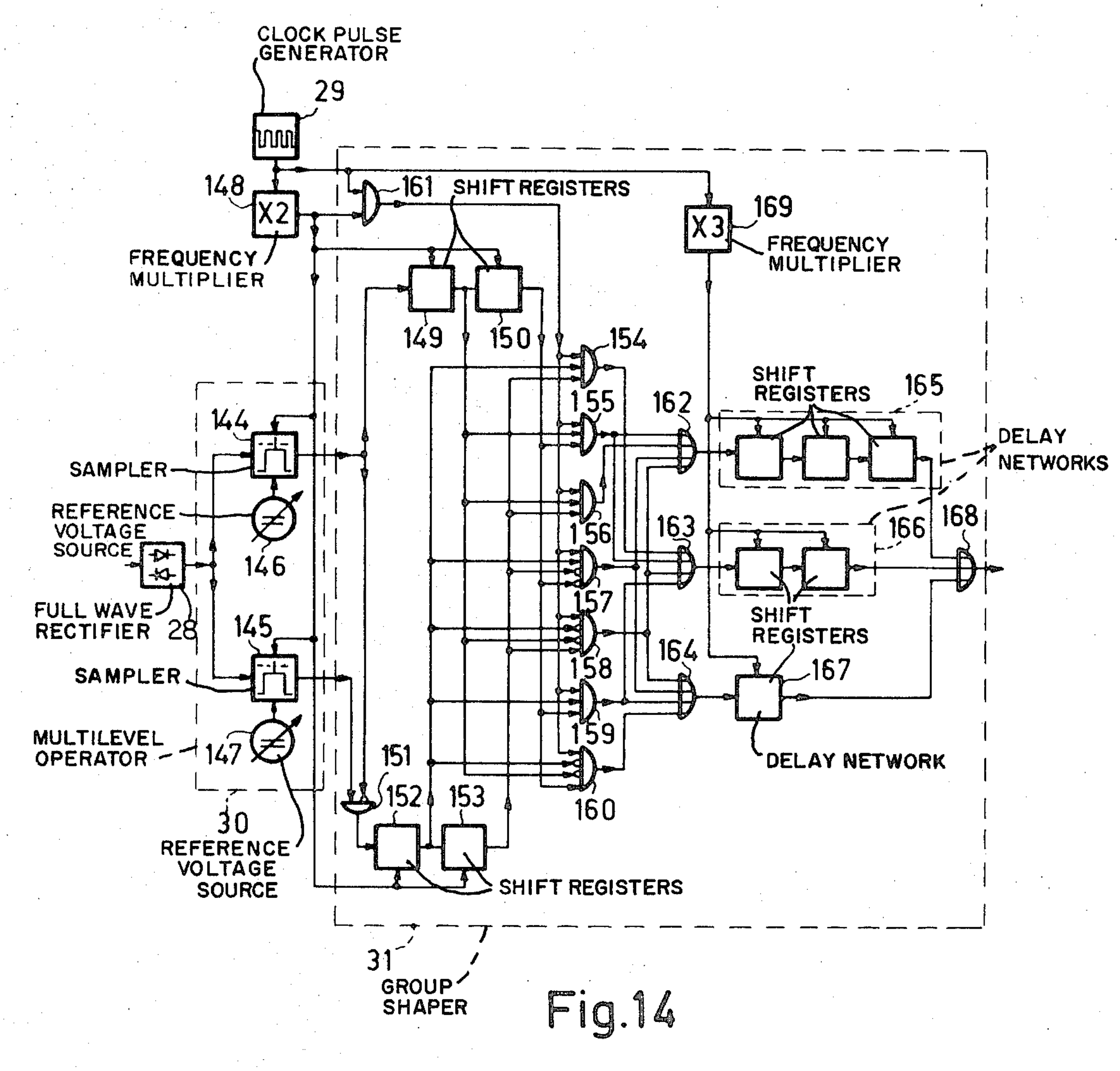
Figure 15:
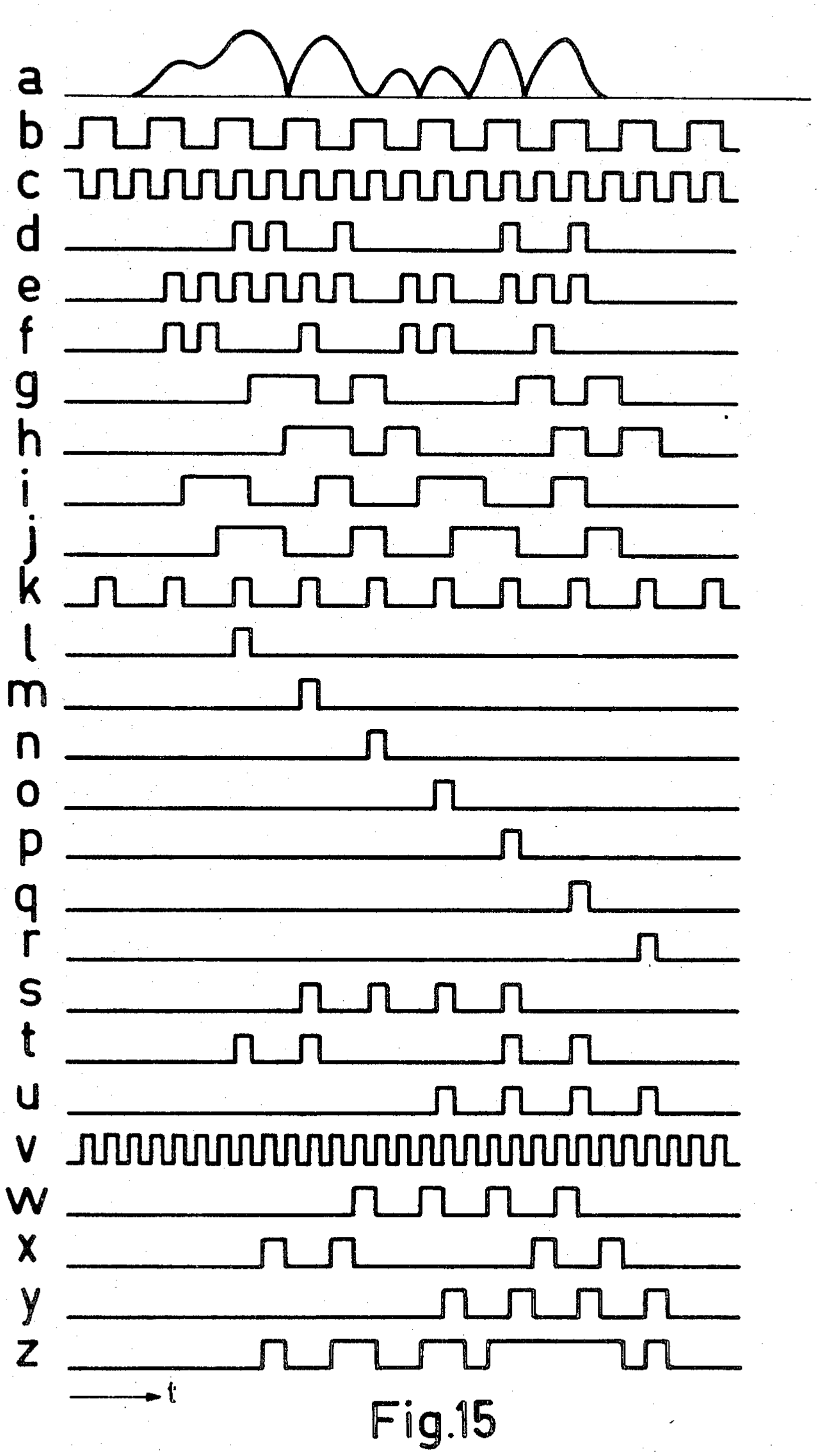

In order that the invention may be readily carried into effect, some embodiments thereof will now be described in detail, by way of example, with reference to the accompanying diagrammatic drawings, in which:

FIG. 1 shows a split diagrammatic view of a transmission system according to the invention, including a transmitter and a receiver for the transmission of a seven-level signal, while FIGS. 2 and 3 show time diagrams to explain the transmission system of FIG. 1, FIG. 4 shows a detailed embodiment of the transmitter of FIG. 1, while FIG. 5 shows time diagrams to explain the transmitter of FIG. 4, FIG. 6 shows the amplitude-frequency characteristic of the pseudo-ternary code converter, FIG. 7 shows a detailed embodiment of the cascade arrangement of the full-wave rectifier, the level separation device and the pulse group shaper, while FIG. 8 shows time diagrams to explain FIG. 7, FIG. 9 shows a transmitter which due to the use of digital filters is particularly suitable for transmission of a multilevel pulse series by means of single sideband modulation, FIG. 10 shows an amplitude-frequency characteristic of the digital filter used in FIG. 9, FIG. 11 shows a modification of the transmitter of FIG. 9, FIG. 12 shows a transmitter for the transmission of a five-level signal, while FIG. 13 shows time diagrams to explain the transmitter of FIG. 12, FIG. 14 shows an embodiment of a receiver for the reception of a five-level signal, while FIG. 15 shows time diagrams to explain the receiver of FIG. 14.

Now referring to FIG. 1 a transmission system according to the invention is shown, including a transmitter and a receiver for the transmission of signals to which a frequency band of, for example, 2,400 Hz. is alloted. A binary pulse series within which the pulses assume the logical value of "0" or "1" occurs in the transmitter at the output of an information source 3. Under the control of a series of equidistant clock pulses having a pulse repetition frequency of, for example, 9,600 Hz. Pulses to said information source 3 are derived from a clock pulse generator 2 through a frequency multiplier 1. The clock pulse generator 2 has a pulse repetition frequency of, for example, 4,800 Hz. The binary pulse series is applied to a multilevel coder 4 from whose output a multilevel pulse series is derived. The pulses assume at least five amplitude levels. The multilevel pulse series is applied through a lowpass filter 5 to a modulator 6 to which also an oscillator 7 is connected. Spectral zero points occur at prescribed positions in the frequency spectrum of the multilevel pulse series, which points may be utilized for co-transmitting pilot signals, but which may also simplify the construction of the low-pass filter 5. Furthermore, the modulator 6 may also serve, for example, as a frequency modulator or as an amplitude modulator. The output signal from the modulator 6 is furthermore applied through a bandpass filter 8 and a transmitter amplifier 9 to a transmission path 10 which may be, for example, a telephony connection.

In the receiver shown in FIG. 1 the received carrier-modulated multilevel pulse series is applied through a receiver amplifier 11 and a bandpass filter 12 to a demodulator 13 to which also an oscillator 14 is connected whose frequency is equal to that of the oscillator 7 in the transmitter. The output signal from the demodulator 13 is applied through a lowpass filter 15 to a multilevel decoder 16 from whose output the original binary pulse series is derived which is applied to a user 17.

A considerable increase in the rate of information may be obtained with the aid of such transmission systems but there is no uniform relationship between the binary pulse series and the absolute value of the amplitude of the transmitted multilevel pulse series which includes at least five amplitude levels.

In order to achieve uniformity in such a transmission system in a simple manner, the multilevel coder 4 in the transmitter is built up from a pulse group analyzer 18 controlled by a clock pulse generator 2 and includes $m$ parallel output lines. The analyzer analyzes successive pulse groups a number of binary pulses ($K$) of the binary pulse series and supplies to each output line a binary pulse series characteristic of the analyzed pulse group. The the pulses of the series assume the logical value "0" or "1." At each instant, not more than one of the output lines has the logical value "1" and the number of pulses in the pulse series is smaller for all output lines than the number of pulses $k$ in the analyzed pulse group. All output lines incorporate a mutually equal pseudo-ternary code converter 19, 20, and 21 controlled by the clock pulse generator 2, and in addition $m-1$ output lines incorporate an amplitude control device 22, 23 arranged in cascade with the pseudo-ternary code converter 20, 21, which output lines are connected to a linear combination device in the form of a linear adder 24 from whose output, a multilevel pulse series is derived within which the pulses assume $2m+1$ levels.

In the embodiment shown in FIG. 1, the pulse group analyzer 18 includes $m = 3$ output lines 25, 26, and 27, and the number of pulses in the analyzed pulse group $k = 2$. If the pulse group (0, 1) occurs at the input of the pulse group analyzer 18, the output lines 25, 26, 27 assume the logical values 1, 0, 0, respectively. For a pulse group (1, 1) at the input of the pulse group analyzer 18, the output lines 25, 26, and 27, assume the logical values 0, 1, 0, respectively. And for a pulse group (1, 0) at the input of the pulse group analyzer 18, the logical values of the output lines 25, 26 and 27 become 0, 0, 1, respectively. For a pulse group (0, 0) at the input of the pulse group analyzer 18, all output lines assume the logical value "0."

In this manner a relationship is established between input and output signals of the pulse group analyzer 18. In fact, the presence of a pulse on a certain output line (for example, 26) or the absence of a pulse on all output lines means that a certain pulse group ((1, 1) or (0, 0)respectively) is present at the input of the pulse group analyzer 18. If the pulse series shown in FIG. 2$a$ is applied to the pulse group analyzer 18, the pulse series shown in FIGS. 2$b$, 2$c$ and 2$d$ are derived from the output lines 25, 26, 27, while at each instant not more than one of the output lines has the logical value "1." For introducing spectral zeros in the frequency spectrum to be transmitted, a digital filter process is used by employing a pseudo-ternary code converter which will be described hereinafter. Particularly the pulse series occurring at the output lines 25, 26, and 27 are applied to the pseudo-ternary code converter 19, 20, 21 from whose output a pulse series is derived within which the pulses assume three amplitude levels, namely the levels $-1, 0, +1$. The pulse series is shown in FIGS. 2$e$, 2$f$ and 2$g$, respectively. The levels $+1$ and $-1$ in the pseudo-ternary pulse series have the same significance. In fact, if the level $+1$ or $-1$ occurs at the output of the code converter, a pulse is present at the input thereof, which corresponds uniformly to a certain pulse group at the input of the pulse group analyzer 18. The pulse series which are derived from the code converters 20 and 21 are furthermore applied to amplitude control devices 22 and 23, respectively, which multiply the amplitudes of the occurring pulses by factors of 2 and 3, respectively. The pulse series within which the pulses assume the amplitude levels $-2, 0, +2$ and $-3, 0, +3$ occur of the output at the amplitude control devices 22 and 23, respectively. The pulse series shown in FIG. 2$h$ and within which the pulses assume the seven amplitude levels $-3, -2, -1, 0, 1, 2, 3$ is derived from the output of the linear adder 24.

FIG. 2$k$ shows the seven-level signal to be applied through the lowpass filter 5 to the modulator 6, and then transmitted through the transmission path 10 after modulation. As will be described hereinafter, the construction of the lowpass filter 5 is considerably simplified as a result of the digital filtering process by means of the pseudo-ternary code converters 19, 20, and 21.

A uniform relationship is obtained between the absolute value of the multilevel output signal and the binary input signal of the transmitter according to the invention, by using the special pulse group analysis by means of the pulse group analyzer 18, the digital filtering process by means of each pseudo-ternary code converter 19, 20, and 21, and amplitude multiplication by means of the amplitude control devices 22 and 23. Thus, for example, in the seven-level signal of FIG. 2*h* an amplitude level ±3, ±2, ±1, 0 corresponds to a pulse group (1, 0), (1, 1), (0, 1), (0, 0) respectively. Without complicated time separation and synchronizing steps the original binary pulse signal can be recovered from the transmitted seven-level signal with the aid of a simple level separator in the receiver.

The recovery of the original binary pulse signal in the receiver is not only very simple, but this simplicity also applies to the equipment used in the transmitter and the receiver. Therefore, a convenient and also complete digital structure of transmitter and receiver may be built up from integrated circuits and are thus suitable for integration in a semiconductor body.

In the receiver, the received carrier-modulated multilevel signal is applied after demodulation in the demodulator 13, to a cascade arrangement of a full-wave rectifier 28, and a level separator 30, which is controlled by a local clock pulse generator 29 synchronized with the clock pulse generator 2 in the transmitter. The level separator 30 includes a number of parallel output lines ($m$) from which a binary pulse series is derived, within which the pulses assume the logical value "0" or "1". The output lines are connected to a pulse group shaper 31 to which also the local clock pulse generator 29 is connected. To generate the original binary pulse series, the pulse group shaper 31 converts the binary pulse series applied thereto through via the parallel output lines of the level separator 30 into successive pulse groups each consisting of a ($K$)number of binary pulses. In the receiver shown, the level separator 30 includes $m = 3$ parallel output lines 32, 33, and 34, analogous to the pulse group analyzer 18 in the transmitter shown, and the pulse groups provided by the pulse group shaper 31, comprise $k = 2$ binary pulses.

The seven-level signal of the shape shown in FIG. 2*k*, is recovered after demodulation in the demodulator 13 and filtered by filter 15. It is converted by the full-wave rectifier 28 into a signal having four levels to which the values 0, 1, 2 and 3 are allotted at the clock instants, as shown in FIG. 3*a*. Since the respective levels +1, −1; +2, −2; +3, −3; in the seven-level signal have the same significance and correspond to only one given pulse group comprising two binary pulses, it follows that the information contents of the four-level signal according to FIG. 3*a* is equal to the information contents of the seven-level signal according to FIG. 2*k*, and that each level in the four level signal corresponds to only one given pulse group of two binary pulses. When the levels 1, 2, and 3 occur in the four-level signal, 2, 2 and 3 output lines of the level separator 30 assume the logical value "1" under the control of the clock pulses shown in FIG. 3*b*, and originating from the local clock pulse generator 29. For example, the output lines (34); (33, 34); and (32, 33, 34), while at the occurrence of the level 0 in the four-level signal all assume the logical value "0." The pulse series produced in this manner at the output lines 32, 33, 34 are shown in FIGS. 3*c*, 3*d* and 3*e*, respectively. Since each level in the four-level signal corresponds to only one given pulse group, the pulse group shaper 32, applies the pulse groups (0, 1); (1, 1) (1, 0) to the user 17 in the presence of a "1" at 1, 2, and 3 output lines, respectively. In other words, at an amplitude level of 1, 2 and 3, respectively, of the four-level signal, while in the presence of a "0" on all output lines, the pulse group shaper 31 applies the pulse group (0, 0) to the user 17. In this manner, the pulse series supplied to the user 17 and as shown in FIG. 3*f* follows from the pulse series shown in FIGS. 3*c*, 3*d* and 3*e*. This pulse series is equal to the pulse series shown in FIG. 2*a*, which is derived from the information source 3 in the transmitter.

As already previously noted, the structure of the receiver is particularly simple and convenient in the inventive transmission system wherein a multilevel pulse transmission is brought about by using a special pulse group analysis, followed by a digital filtering process, and an amplitude control; inter alia, it is not necessary to recognize $2m+1$ levels but only $m+1$ levels in order to recover the original binary pulse series and complicated synchronizing steps. For example, group synchronization need not be used. In addition, this structure allows of a complete integration in a semiconductor body. The slightly critical adjustment and insensitivity to tolerances is necessary for this integration, so that risks of interference are reduced to a great extent.

FIG. 4 shows an embodiment of the pulse group analyzer 18, having three output lines 25, 26, and 27, and the pseudo-ternary code converters 19, 20, and 21 incorporated therein. In this embodiment, the pulse series derived from the information source 3, is applied in the first instance directly to AND-gates 35, and 36, or through an inverter 37 to an AND-gate 38; and in the second instance through a delay network 39 directly to the AND-gates 36, and 38, or through an inverter 40 to the AND-gate 35. The clock pulse generator 2 is connected to all AND-gates 35, 36, and 38. The outputs of the AND-gates 35, 36, and 38 are connected to the inputs of the pulse wideners 41, 42, and 43, respectively, whose output lines 25, 26, and 27 are connected to code converters 19, 20, and 21, respectively.

In the embodiment shown in FIG. 4, only the code converter 19 is shown in detail. The output line 25 in the code converter 19, is connected to a modulo-2-adder 44, whose output pulse series is applied directly on the one hand to a combination device 45 which is formed as a linear difference producer, and on the other hand through a delay network 46 to a second input of the modulo-2- adder 44 as well as to a second input of the linear difference producer 45. As is known, the modulo-2-adder only provides an output pulse, if pulses of different values occur simultaneously at both inputs, and does not provide an output pulse, if the two input pulses of the same value occur simultaneously. In this embodiment the delay network 39 and the pulse wideners 41, 42, and 43 are formed as a shift register element and the delay network 46, which has a delay period of $\tau$, is formed as a cascade arrangement of two shift register elements 47, and 48. The clock pulse input of the delay network 39 is connected to the output of the multiplier 1, and the clock pulse inputs of the pulse wideners 41, 42, and 43, and of the shift register elements 47 and 48, are connected to the output of the clock pulse generator 2. The operation of the pulse group analyzer 18, and the pseudo-ternary code converters 19, 20 and 21 will now be described in greater detail with reference to the time diagrams of FIG. 5.

FIG. 5*a* shows a pulse series originating from the information source 3. For the sake of simplicity this pulse series is taken to be the same as that of the pulse series which is shown in FIG. 2*a*. The duration of a binary pulse within this pulse series is T/2 in which T represents the clock period of the clock pulse generator 2. By delaying this pulse series over a period T/2 with the aid of the delay network 39, the pulse series shown in FIG. 5*b* is derived from the output thereof. At the instants of occurrence of the clock pulses of width T/2 shown in FIG. 5*b*, a pulse having a pulse width of T/2 occurs at the output of the AND-gate 35 for each pulse group (0, 1) which is provided by the information source 3. The pulse series produced in this manner is shown in FIG. 5*d*. The pulse series shown in FIG. 5*e* occurs at the output of the AND-gate 36. In this series a pulse occurs, if a pulse group (1, 1) is provided by the information source 3. FIG. 5*f* shows the pulse series which occurs at the output of the AND-gate 38 which a pulse corresponds to a pulse group (1, 0) provided by the information source 3.

It is evident from FIGS. 5*d*, 5*e*, and 5*f* that at each instant, a pulse is present at not more than one of the output lines of the AND-gates 35, 36, and 38, while for a pulse group (0,0) provided by the information source 3, a pulse does not occur at any of the outputs of the AND-gates 35, 36, and 38. The pulse width T/2 of the pulses occurring at the outputs of the AND-gates 35, 36, and 38 is enlarged to T by the pulse wideners 41, 42, and 43, respectively. As a result, the pulse series which is shown in FIGS. 5*d*, 5*e*, and 5*f* is changed over to the pulse series shown in FIGS. 5*g*, 5*h*, 5*k* and. The resultant pulse series is applied to the code converters 19, 20, 21, and respectively.

Since the code converters are formed in the same manner, only the operation of the code converter 19 will be described in greater detail.

In this embodiment the delay period $\tau$ of the delay network 46 is 2T. When the pulse series shown in FIG. 5*g* is applied through line 25 to the modulo-2-adder 44, the pulse series shown in FIG. 5l occurs. For example, at the output of the modulo-2- adder 44, a pulse series may be mathematically represented by $a(t)$. After a delay over a period 2T by means of the delay network 46, the pulse series shown in FIG. 5*m* occurs which may be mathematically represented by $a(t\text{-}2T)$. By difference production of $a(t)$ and $a(t\text{-}2T)$ by means of the difference producer 45, a pulse series is derived in which the pulses assume the three levels −1, 0, +1. In fact, if $a(t)$ and $a(t\text{-}2T)$ have the same logical value, a "0" occurs at the output of the difference producer 45. If the logical values of $a(t)$ and $a(t\text{-}2T)$ are different, a "1" or *a* −1 occurs at the output of the difference producer 45. This depends on whether $a(t)$ has the logical value "1" and $a(t\text{-}2T)$ has the logical value "0," or conversely if $a(t)$ has a logical value "0" and $a(t\text{-}2T)$ has the logical value "1." The output pulse series of the code converter 19 obtained in this manner is shown in FIG. 5*n*.

The output pulse series of the code converters 20, 21 are shown in FIGS. 5*p*, 5*q*, respectively.

After multiplication of the amplitudes of the ternary pulse series shown in FIGS. 5*n*, 5*p*, 5*q* by factors of 1, 2 and 3, respectively, and the combinations occuring in the linear combination device 24, the seven-level signal shown in FIG. 5*r* is derived which corresponds to the seven-level signal shown in FIG. 2*h*.

The output signal of the difference producer 45 is found to have a frequency spectrum due to difference production of the two mutually time-shifted pulse series $a(t)$ and $a(t\text{-}2T)$. The frequency spectrum is particularly suitable for single sideband modulation as will now be described.

Let it be assumed that a signal $Ae^{j\omega t}$ is applied through line 49 to the difference producer 45. The signal in line 50 delayed over two clock periods 2T may be represented by $Ae^{j\omega(t-2T)}$, in which A is the amplitude, $\omega$ is the angular frequency and $j$ is $\sqrt{-1}$. A signal of the shape occurs at the output of the difference producer 45 having the:

$$Ae^{j\omega t}(1-e^{-2j\omega T})$$

The transfer characteristic $\phi(\omega)$ of the code converter may be written as:

$$\phi(\omega)=1-e^{-2j\omega T};$$

or after some derivation:

$$\phi(\omega)=Ce^{-j(\omega T-\pi/2)}\sin\omega T.$$

wherein: $C$ represents a constant. Thus, a spectrum component of arbitrary angular frequency $\omega$ of the pulse signal applied to the code converter 19 will have a constant time delay in accordance with the factor $e^{-j(\omega T-\pi/2)}$. This factor corresponds to a linear phase characteristic, as well as an amplitude variation which is proportional to the absolute value of $\sin\omega T = \sin 2\pi fT$. This function represents the frequency characteristic $\psi(f)$ of the code converter.

For the purpose of illustration, FIG. 6 shows the frequency characteristic $\psi(f)$ from which it is found that spectral zeros occur for the direct current term, and at integral multiples of the spectrum component ½ T. The seven-level signal obtained at the output of the linear adder 24 has the same spectral zeros as that of the frequency characteristic shown in FIG. 6. In fact, this signal is produced by superposition of the ternary pulse series originating from the mutually equal code converters 19, 20 and 21. Due to this property, the seven-level signal is particularly suitable for single sideband transmission, for on the one hand, the direct current component is suppressed, and on the other hand, only the spectrum components above half the clock frequency ½ *T* need be suppressed, whereby the construction of the low-pass filter 5 may be simplified to a considerable extent.

The seven-level signal recovered in the receiver at the output of the lowpass filter 5 is applied to the decoder 16. One embodiment of decoder 16 is shown in detail in FIG. 7. The output signal from the full-wave rectifier 28 in the multilevel separator 30, is applied to three samplers 51, 52, and 53 controlled by the local clock pulse generator 29, while reference voltage sources 54, 55, and 56 connected to each sampler.

For recovering the original binary pulse series, the output lines 32, 33, and 34 of the samplers 51, 52, and 53, are connected to the pulse group shaper 31. In this shaper, the output line 32 is connected at one end to an OR-gate 57, and at the other end through an inverter 58 to AND-gates 59 and 60. The output line 33 is connected at one end directly to the AND-gate 59, and at the other end through an inverter 61 to the AND-gate 60. The output line 34 is connected directly to the AND-gate 60. The output signal from the AND-gate 59 is applied directly to the OR-gate 57 and indirectly to OR-gate 57 through a delay network 62. The output signal from the AND-gate 60 is applied through a delay network 63 to the OR-gate 57. The delay networks 62 and 63 are formed as shift register elements, whose clock pulse input is connected through a frequency multiplier 64 from the local clock pulse generator 29.

For the purposes of simplification the four-level signal derived from the full-wave rectifier 28 as shown in FIG. 8*a*, is taken to be the same as that of the four-level signal shown in FIG. 3*a*. If this signal is applied to the samplers 51, 52, and 53, these samplers 51, 52, and 53 will produce a pulse having a pulse width of $T/2$ at the instant of occurrence of a clock pulse, of the series of clock pulses shown in FIG. 8*b*. These clock pulses have a period of $T$ and originate from the clock pulse generator 29 synchronized with the clock pulse generator 2 in the transmitter. The level of the reference voltage sources 54, 55, and 56 connected thereto are lower than the level of the four-level signal at the sampling instants. The reference voltage sources 54, 55, and 56 are adjusted at values of 2½, 1½ and ½, respectively, so that the pulse series shown in FIGS. 8*c*, 8*d*, 8*e* are derived from the output lines 32, 33, and 34, respectively. As a result of these pulse series, the pulse series shown in FIGS. 8*f*, and 8*h* occur at the output of the AND-gates 59, and 60, respectively. Versions of these series delayed over a period $T/2$ are shown in FIGS. 8*g*, and 8*i*, respectively. By combination of the pulse series shown in FIGS. 8*c*, 8*f*, 8*g* and 8*i*, the pulse series shown in FIG. 8*k* is produced at the output of the OR-gate 57, which series corresponds to the pulse series of FIGS. 3*f* and 2*a*, and which is derived from the information source 3. As is shown by the time diagrams of FIG. 8, a certain level of the four-level signal, corresponds uniformly to a given pulse group at the output of the OR-gate 57. Particularly in this embodiment the OR-gate 57, provides the pulse group (0,0) at the occurrence of the sampling instant of the level 0; the pulse group (0,1) at the level 1; the pulse group (1,1) at the level 2 and the pulse group (1,0) at the level 3.

By coding pulse series originating from the information source 3 of the transmitter in the described manner, not more than one pulse in the pulse groups recovered by decoding, will assume an erroneous value when interferences (which are not too large) occur in the transmission path. The above code is known as Gary code. For example, if the level 2 is detected as level 3 by the level separator 30, as a result of these interferences, the pulse group (1,0) instead of the pulse group (1,1) is produced at the output of the OR-gate 57. Therefore, only the second pulse has changed its value. However, if level 2 is detected as level 1, the pulse group (0,1) instead of the pulse group (1,1) is produced at the output of the OR-gate 57. Therefore, only the first pulse in the pulse group has changed its value.

In addition to the delay period $\tau = 2T$ of the delay network 46 in the pseudo-ternary code converters 19, 20, and 21 employed in FIG. 4, it is alternatively possible to choose a different delay period. In the case of $\tau = T$ spectral zeros occur in the frequency characteristic of the code converters 19, 20, and 21 for the frequencies $f = 0$, and at integral multiples of the spectrum component $1/T$. It is alternatively possible to form the combination device 45 as a linear adder in case of a delay period of for example $\tau = T$ of the network 46, in which case spectral zeros occur in the frequency characteristic of the code converters 19, 20, and 21 at integral odd multiples of the spectrum component $1/2T$.

FIG. 9 shows a modification of the transmitter according to the invention shown in FIGS. 1 and 3, in which the output filter 5 is more simplified. Instead of the band-producing element following the modulo-2-adder in the pseudo-ternary code converters, and being formed as a difference producer, to which on the one hand directly and on the other hand through a delay network, the output signal from the modulo-2- adder is applied, the band-producing element in the pseudo-ternary code converters in FIG. 9 is constituted by digital filters 65, 66, and 67. The digital filter 65 in the output line 25 is illustrated in greater detail.

Particularly this digital filter is built up from a cascade arrangement of, for example, six shift register elements 68, 69, 70, 71, and 73 whose contents are shifted under the control of a series of equidistant clock pulses having a pulse repetition frequency of, for example, 9,600 Hz. The pulses are derived from the clock pulse generator 2 by means of a frequency multiplier 74. The output line 49 of the modulo-2- adder 44 is connected directly and through an inverter 75 to the inputs of the shift register element 68.

To obtain a certain frequency characteristic, for example, a sinusoidal frequency characteristic suitable for single sideband transmission as shown in FIG. 10, the binary pulses occurring at the outputs of the shift register elements 68, 69, 70, 71, 72, and 73 are applied through attenuation networks 76, 77, 78, 79, 80, 81, and 82 in the form of resistors, to a combination device in the form of resistor 83. The attenuation resistors 76, 82; 77, 81; and 78, 80 have been made pairwise equal, and pulses of equal polarity are applied to the mutually equal attenuation resistors 76, 82; 77, 81; and 78, 80. The transfer coefficients of the attenuation resistors 76–82 may be represented by $C_{-3}$, $C_{-2}$, $C_{-1}$, $C_0$, $C_1$, $C_2$, and $C_3$, respectively. In the U.S. Pat. No. 3,500,215, and U.S. application Ser. No. 728,706, filed May 13, 1968, it has been shown that with $2N$ shift register elements, and with attenuation networks which in the manner as described above have been made pairwise equal, and in which their transfer coefficients $C_k$ satisfy:

$$C_{-k} = C_k \text{ for } k = 1, 2, \ldots N,$$

a transfer function is obtained at a certain shift period $\alpha$, the amplitude-frequency characteristic $\psi(\omega)$ of which has the form of:

$$\psi(\omega) C_0 + \sum_{k=1}^{N} 2C_k \cdot \cos k\omega\alpha$$

while the phase-frequency characteristic $\phi(\omega)$ varies exactly linearly in accordance with:

$$\phi(\omega) = -N\omega\alpha$$

The amplitude-frequency characteristic thus constitutes a Fourier series developed in cosine terms whose periodicity $\Omega$ is given by:

$$\Omega\alpha = 2\pi$$

If a certain amplitude-frequency characteristic $\psi(\omega)$ is to be realized, the coefficients $C_k$ in the Fourier series may be determined with the aid of the relation:

$$C_k = (1/\Omega)\int_0^{\Omega} \psi_0(\omega)\ \cos\ k\omega\alpha\cdot d\omega$$

The form of the amplitude-frequency characteristic is completely determined thereby, but the periodic behavior of the Fourier series results in the desired amplitude-frequency characteristic being repeated at a periodicity $\Omega$ in the frequency spectrum, thus producing additional pass regions. In practice these additional pass regions are not disturbing, because for a sufficiently large value of the periodicity $\Omega$ and a sufficiently small value of the shift period $\alpha$, the frequency distance between the desired and the subsequent additional pass region is sufficiently large. This is able to suppress the additional pass regions by means of a low-pass filter 87 incorporated in the output lines 84, 85, and 86 of the digital filters 65, 66, and 67 without influencing the amplitude-frequency characteristic and the linearity of the phase-frequency characteristic in the desired pass region.

In the transmitter of FIG. 4, the desired and undesired pass regions are adjacent, as is shown in FIG. 6. A frequency space within which the frequency components have an amplitude value of substantially zero is created in the transmitter according to FIG. 9, with the aid of the digital filter 65 between the desired and undesired pass regions, so that the low-pass filter 87 connected to the output lines 84, 85, and 86 can be simplified considerably. In addition a linear phase characteristic is obtained so that no additional phase equalization is necessary. In case of equal pass regions of the transmitter shown in FIGS. 1, 4 and 9, the transfer characteristics are equal too. For example, if the pulse signal shown in FIG. 2*a* is applied to the transmitter of FIG. 9, exactly the same output signal as shown in FIG. 2*k* is derived from the output of the lowpass filter 87 by using the amplitude control devices 22, and 23.

The amplitude-frequency characteristic of FIG. 10 may not only be developed in cosine terms, but also in sine terms. In the embodiment shown, the shift register elements 68–73 are connected for this purpose through a second series of attenuation resistors 88–93 to a combination device constituted by a resistor 94. Also in this second series of attenuation resistors, the resistances of the attenuation resistors 88, 93; 89, 92; and 90, 91 have been made pairwise equal, but in this case, pulse signals of opposite polarity are applied to the mutually equal attenuation resistors 88, 93; 89, 92; and 90, 91. As a result, coefficients $C_k$ of opposite sign are developed in the Fourier series, so that an amplitude-frequency characteristic $\psi(\omega)$ in the form of a Fourier series developed in sine terms is obtained at a linear phase-frequency characteristic. For a digital filter having $2N$ shift register elements, and transfer coefficients $C_k$ which satisfy:

$$C_{-k} = -C_k \text{ for } k = 1, 2 \ldots N$$

the transfer function is determined by:

$$\psi(\omega) = \sum_{k=1}^{N} 2C_k \sin k\omega\alpha$$

$$\phi(\omega) = -N\omega\alpha + \pi/2$$

in which the coefficients $C_k$ in the Fourier series can be determined from the relation:

$$C_k = (1/\Omega)\cdot\int_0^{\Omega} \psi_0(\omega)\cdot\sin\ k\omega\alpha\cdot d\omega$$

Also for this development of the amplitude-frequency characteristic, the frequency space between the desired and undesired pass regions is equally large, as in FIG. 10, so that the additional pass region can be suppressed by a lowpass filter 98 incorporated in the output lines 95, 96, and 97 of the digital filters 65, 66, and 67. Here, too, the low-pass filter and 98, can be simplified considerably.

The device described is not only distinguished by a simplification of the lowpass filters 87, 98 and by a greater freedom in the form of the amplitude-frequency characteristic, but single sideband modulation may also be used in a surprisingly simple manner with the aid of the device shown in FIG. 9. To this end, the outputs of the lowpass filters 87, and 98 are connected to a modulator, for example, in the form of push-pull modulators 99, and 100. Carriers having a frequency of, for example, 3 kHz, and being mutually shifted over $\pi/2$ in phase, and originating from a common carrier oscillator 102 are applied thereto, while using a phase shifting network 101. The outputs of the push-pull modulators 99, and 100 are connected to a lowpass filter 103, whose output signal is applied through the transmitter amplifier 9 to the transmission path 10. The cut-off frequencies of said transmission path 10 being, for example 0.3 and 3.4 kHz.

When the signals derived from the lowpass filters 87, and 98, which are mutually shifted over $\pi/2$ in phase, are applied to the push-pull modulators 99, and 100, a signal is derived from the output of the lowpass filter 103 having a frequency spectrum within which one of the sidebands generated by modulation has dropped out. This is a result of the superposition of the two output signals of the push-pull modulators 99, and 100, so that the lowpass filter 103 is very simple. Thus, a single sideband signal is obtained which is located within the frequency range of 0.6 and 3 kHz.

FIG. 11 shows a modification of the transmitter for single sideband transmission shown in FIG. 9, in which a different method is used to obtain single sideband transmission. Here, use is made of the property of square-wave synchronous pulse signals. The information content of the base band of the pulse spectrum extending from 0 Hz to the frequency which corresponds to half the clock frequency is repeated for higher frequencies, but the information content of each of the higher spectrum bands is reflected relative to its previous band. Thus, for example, at a clock frequency of 4,800 Hz, the pulse spectrum located in the base band of from 0 – 2,400 Hz is shifted in frequency every time over 2,400 Hz, and the information content of a certain spectrum band is reflected relative to its previous spectrum band.

This property is used by utilizing the pseudo-ternary code converters constituted by the modulo-2- adder 44, the delay network 46, and the digital filter 104 simultaneously for the single sideband generation. Particularly at a clock frequency of 4,800 Hz, the spectrum band located between 4,800 and 7,200 Hz is selected from the pulse spectrum with the aid of the digital filters 104, 105, 106 and.

In order to be able to transmit the obtained single sideband signal located in the frequency band of 4,800–7,200 Hz within the desired frequency band, the output lines 107, 108, and 109 of the digital filters 104, 105, and 106 are connected through a lowpass filter 110 to a frequency transposition stage. This stage is constituted by a modulator 112 connected to a local oscillator 111, and an output filter in the form of a lowpass filter 113. If it is desired, for example, that the single sideband signal is transmitted within the frequency band of 300–3,400 Hz, the frequency of the local oscillator 111 may be taken to be, for example, 7,800 Hz.

The form of the amplitude-frequency characteristics of the digital filters 104, 105, and 106 in the pseudo-ternary code converters 19, 20, and 21 of FIG. 11, is equal to that of the amplitude-frequency characteristics of the digital filters 65, 66, and 67 shown in FIG. 9. The output signals which are derived from the lowpass filters 103, and 113 after modulation are exactly equal for a certain input signal of the transmitters according to FIGS. 9 and 11.

In addition to the pulse group analyzer 18 shown in FIG. 1, provided with three parallel output lines, which analyzes groups of two binary pulses, the pulse group analyzer 18 may generally be provided with m parallel output lines. This pulse group analyzer analyzes subsequent pulse groups from the binary pulse series applied thereto. These pulse groups consist of $k$ binary pulses and provide a pulse series characteristic of the analyzed pulse group to each output line, which pulse series consists of n binary pulses. In order to obtain an increased rate of information, $n$ is chosen to be $<k$.

The pulse series occurring at the output lines of the pulse group analyzer and being characteristic of a certain pulse group $S_1, S_2, S_3, \ldots S_k$ may be represented in matrix form by:

$$\begin{pmatrix} a_{11}a_{12}a_{13} & \ldots & a_{1n} \\ a_{21}a_{22}a_{23} & \ldots & a_{2n} \\ \cdot & & \\ \cdot & & \\ \cdot & & \\ a_{m1}a_{m2}a_{m3} & \ldots & a_{mn} \end{pmatrix} \quad (1)$$

In this matrix, all elements assume the logical value "0" or "1," and the first index of each element relates to the rank number of the output line of the pulse group analyzer and the second index relates to the rank number of occurrence in the relevant output lines.

For use in the transmission system according to the invention only a limited number of $m$ pulse series to be selected from all possible combinations are usable. Particularly, the requirement must be satisfied that a uniform relationship must be obtained between the absolute value of the level in the multilevel signal at the output of the coder, and the pulse groups applied thereto. To this end, not more than one of the output lines may assume the logical value "1" at each instant, and all output lines assume the logical value "0," if all pulses in the pulse group $S_1, S_2, \ldots S_k$ assume the logical value "0." This means that not more than one of the elements in a column of the matrix (1) may assume the value "1," and consequently $m+1$ different columns are possible. The total number of matrices, therefore, is $(m+1)^n$ under this limitation. To be able to characterize each pulse group by means of a certain matrix, the following relation must be satisfied $$2^k \leq (m+1)^n \quad (2)$$

$$k/n \leq {}^2\log(m+1) \quad (3)$$

$2^k$ represents the total number of different pulse groups each containing $k$ binary pulses.

If the pulse group analyzer is provided with $m = 3$ output lines, the relation $k/n \leq 2$ is already satisfied by $n = 1$ and $k = 2$. This means that for three output lines, pulse groups are analyzed consisting of two binary pulses, and a pulse series consisting of one binary pulse is applied to each output line. This embodiment of the pulse group analyzer for the transmission of seven-level signals has already been described hereinbefore.

To obtain a five-level signal, the pulse group analyzer is provided with $m = 2$ output lines for which case the expression (3) $k/n \leq {}^2\log 3 = 1.58$ is satisfied by, for example, $k = 11$ and $n = 7$, but also by $k = 3$ and $n = 2$. That is to say, for two output lines, pulse groups are analyzed consisting of three binary pulses, and a pulse series consisting of two binary pulses is applied to each output line. This embodiment of the pulse group analyzer is shown in detail in FIG. 12.

In this embodiment, pulse series occurring at the output of the information source 3 are applied under the control of equidistant clock pulses. These pulses have a pulse repetition frequency of, for example, 2,400 Hz and are derived through a frequency multiplier 1 having a multiplication factor of 3, from the clock pulse generator 2. The pulses are applied to inhibitor inputs of AND-gates 114, 119, and 120 and to AND-gates 115, 116, 117, and 118, as well as to a delay network consisting of a cascade arrangement of two shift register elements 121 and 122 whose clock pulse inputs are connected to the output of the frequency multiplier 1. The output of the shift register element 121 is connected to inhibiter inputs of the AND-gates 116, 117, and 120, and to the AND-gates 114, 115, 118, and 119. The output of the shift register element 122 is connected to inhibitor inputs of the AND-gates 114, 115, and 116, and to the AND-gates 117, 118, 119, and 120. In addition, a clock signal which is derived from an output line 123 of a clock circuit 124 is applied to all AND-gates 114, 115, 116, 117, 118, 119, and 120. The outputs of the AND-gates 114, 116, and 118 are applied through an OR-gate 125 and a delay network in the form of a shift register element 126, to an OR-gate 127. The outputs of the AND-gates 114, 117, and 119 are applied through an OR-gate 128 and a cascade arrangement of two shift register elements 129, and 130, to the OR-gate 127. The outputs of the AND-gates 115, and 116 are applied through an OR-gate 131 and a cascade arrangement of two shift register elements 132, and 133, to an OR-gate 134. The outputs of the AND-gates 115, 119, and 120 are also applied to the OR-gate 134 through an OR-gate 135 and a shift register element 136. The clock pulse inputs of the shift register elements 126, 129, 130, 132, 133, and 136 are connected to an output line 137 of the clock circuit 124.

In order to divide the frequency of the clock pulse generator 2, which is turned to a frequency of, for example, 2,400 Hz having a duration of *T*, after multiplication the frequency multiplier 1, in such that a pulse having a pulse duration *T*/3 is provided only once per time interval of *T* to the output line 123 of the clock circuit 124, the clock circuit 124 is provided with a cascade arrangement of two shift register elements 138, and 139. The clock pulse inputs of these registers are connected to the frequency multiplier 1, while the outputs of these shift register elements 138, and 139 are connected through a NOR-gate 140 to the input of the shift register element 138. The output line 123 of the clock circuit 124 is then constituted by the output of the shift register element 138.

In order to obtain a rate of information of, for example, 4,800 bit/sec at the output of the OR-gates 127, and 134, the shift frequency of the shift register elements 126, 129, 130, 132, 133, and 136 will have to be 4,800 Hz. To derive this frequency from the clock pulse generator 2, the output of the shift register element 139 in the clock circuit 124 is connected to an AND-gate 141. The output of the frequency multiplier 1 is also connected to AND-gate 141 through an inhibitor input, which output together with the output line 123 is also applied to an AND-gate and 142. The outputs of the AND-gates 141, 142 are applied to an OR-gate 143, whose output is constituted by the output line 137.

When the pulse series, shown in FIG. 13*a*, consisting of the pulse groups 000, 010, 011, 001, 101, 111, 110, and 100 is derived from the information source 3, the pulse series, shown in FIG. 13*b* and 13*c*, are derived from the shift register elements 121, and 122, respectively. Under the control of the pulse series, shown in FIG. 13*d*, which is derived from the output line 123 of the clock circuit 124, a pulse having a pulse width of *T*/3 occurs at the output of the AND-gate 114 for the pulse group 010 at the output of the information source 3; at the output of the AND-gate 115 for the pulse group 011; of the AND-gate 116 for the pulse group 001; of the AND-gate 117 for the pulse group 101; of the AND-gate 118 for the pulse group 111; of the AND-gate 119 for the pulse group 110; and of the AND-gate 120 for the pulse group 100, while a pulse does not occur at any of the outputs of the AND-gates 114, 115, 116, 117, 118, 119, and 120 for the pulse group 000 at the output of the information source 3. The pulses occurring at the output of the AND-gates 114, 115, 116, 117, 118, 119, and 120 are shown in FIGS. 13*e* to 13*k*, respectively. Under this control the pulse series shown in FIGS. 13*l* to 13*p* is derived from the OR-gates 125, 128, 131, and 135, respectively. This pulse series under the control of the pulse series shown in FIG. 13*q* is derived from the output line 137 of the clock circuit 124 applied to the OR-gates 127, and 134 in the shape shown in FIGS. 13*r*–*13u*. The pulse duration of the pulses occurring at the inputs of the OR-gates 127, and 134 is in this case *T*/2. The pulse series shown in FIGS. 13*w*, and 13*y* are derived from the outputs of the OR-gates 127, and 134, respectively, from which it appears, that at each instant, a pulse occurs at not more than one of the outputs of the OR-gates 127, and 134.

For this embodiment, the matrix (1) for the pulse group 010 has the shape of, for example:

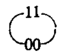

and for the pulse group 011 it has the shape of, for example:

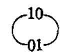

After conversion of the pulse series shown in FIGS. 13*w* and 13*y* into ternary pulse series by means of the pseudoternary code converters 19 and 20, which are connected to the outputs of the OR-gates 127 and 134, respectively, and which are formed, for example, as shown in FIG. 4, the five-level signal shown in FIGS. 13*x* and 13*z* is derived from the output of the linear combination device 24 and the lowpass filter 5. The output signal of the lowpass filter 5 is applied to a transmission path after it has been modulated on a carrier.

In the receiver, the received five-level signal after demodulation is applied to the decoder, shown in FIG. 14. The five-level signal is converted by the full-wave rectifier 28 into a three-level signal which in the multilevel separator 30 is applied to two samplers 144, and 145. Each sampler has a reference voltage source 146, and 147 connected thereto. Samplers 144, 145 are controlled by a pulse series within which the pulses occur at a pulse repetition frequency of, for example, 4,800 Hz. This is derived by means of a frequency multiplier 148 from the clock pulse generator 29 whose pulse repetition frequency is 2,400 Hz.

For recovering the original binary pulse series, the output line of the sampler 144 in the pulse group shaper 31 is applied at one end to a delay network. This network is formed as a cascade arrangement of two shift register elements 149, and 150. It is applied at the other end to an inhibitor input of an AND-gate 151 to which the output line of the sampler 145 is also connected. The output of the AND-gate 151 is applied to a delay network which is formed by a cascade arrangement of two shift register elements 152, and 153. The clock pulse inputs of the shift register elements 149, 150, 152, and 153 are connected to the output of the frequency multiplier 148. The output signal from the shift register element 149 is applied to the AND-gates 155, and 156, and to inhibitor inputs of AND-gates 158, and 160. The output signal from the shift register element 150 is applied to AND-gates 155, 159, and 160, and to an inhibitor input of an AND-gate 157. The output signal from the shift register element 152 is applied to AND-gates 154, 157, and 159, and to an inhibitor input of the AND-gates 158, and 160, while the output signal from the shift register element 153 is applied to AND-gates 154, 156, 158 and to an inhibitor input of the AND-gate 157. In addition, a clock signal, which is derived from an AND-gate 161 connected to the output of the clock pulse generator 29 and the frequency multiplier 148, is applied to all AND-gates 154, 155, 156, 157, 158, 159, and 160. The outputs of the AND-gates 155, 156, 157, and 158 are applied through an OR-gate 162, and a delay network 165 which is a cascade arrangement of three shift register elements, to an OR-gate 168. The outputs of the AND-gates 154, 155, 158, and 159 are applied through an OR-gate 163 and a delay network 166 in the form of a cascade arrangement of two shift register elements, to the OR-gate 168. The outputs of the AND-gates 157, 158, 159, 160 are also applied to OR-gate 168 through a shift register element 167 and an OR-gate 164. The clock pulse inputs of the delay networks 165, 166, and 167 are connected to a frequency multiplier 169, which converts the pulse series having a frequency of 2,400 Hz, originating from the clock pulse generator 29, into a pulse series having a frequency of 7,200 Hz.

When the three-level signal derived from the full-wave rectifier 28, shown in FIG. 15*a*, is applied to the samplers 144 and 145 these samplers 144, and 145 will provide a pulse having a pulse width of *T*/4 at the instant of occurrence of a clock pulse from the series of clock pulses shown in FIG. 15*c*. This is derived by means of the frequency multiplier 148 from the pulse series, shown in FIG. 15*b*, which originates from the clock pulse generator 29. The level of the reference voltage sources 146, 147 connected thereto is lower for this pulse than the level of the three-level signal at the instant of sampling. In the embodiment shown, the reference voltage sources 146, and 147 are adjusted at a level of 1½ and ½, respectively, so that the pulse series shown in FIGS. 15*d* and 15*e* are derived from the outputs of the samplers 144, and 145, respectively. As a result, the pulse series shown in FIG. 15*f* occurs at the output of the AND-gate 151. As a result of the pulse series of FIG. 15*d*, pulse series are derived from the output of the shift register elements 149, and 150, whose shape is shown in FIGS. 15*g*, 15*h*, respectively. In a corresponding manner, the pulse series whose shapes are shown in FIGS. 15*i*, 15*j*, respectively, are produced from the pulse series of FIG. 15*f* at the output of the shift register elements 152 and 153. Under the control of the clock pulses shown in FIG. 15*k*, the pulse series shown in FIGS. 15*l* to 15*r* occur at the outputs of the AND-gates 154, 155, 156, 157, 158, 159, and 160. Therefore, the pulse series shown in FIGS. 15*s*, 15*t*, 15*u* occurs at the output of the OR-gates 162, 163, and 164, respectively. This pulse series, under the control of the clock pulses shown in FIG. 15*v*, and originating from the frequency multiplier 169, are converted by the delay networks 165, 166, and 167 into the pulse series shown in FIGS. 15*w*, 15*x*, and 15*y*, respectively. After combination of these pulse series with the aid of the OR-gate 168, the pulse series of FIG. 15*z* occurs at the output thereof. This pulse series is again equal to that of FIG. 13*a*, which pulse series is derived from the information source 3 shown in FIG. 12.

In addition to the embodiments described in the foregoing, other embodiments are alternatively possible. Thus, for example, in the transmitter of FIG. 4, the modulo-2- adder in the form of the modulo-2- adder 44 in the pseudo-ternary code converter 19, may be replaced by a modulo-2- difference producer, and the linear combination device in the form of the linear difference device 45, may be replaced by a linear adder. As is known, a modulo-2- difference producer only provides an output pulse if pulses of equal polarity occur simultaneously at its inputs, and it does not provide an output pulse if both pulses occurring simultaneously at the input have different polarities. Also in this embodiment of the pseudo-ternary code converters, the original binary information signal is recovered by full-wave rectification of its ternary output signal, while the amplitude-frequency characteristic of the pseudo-ternary code converter has a cosine variation. The conversion into another binary pulse series of the binary pulse series which is derived from the pulse group analyzer by the modulo-2- adder 44 and the delay network 46, may alternatively be obtained by using so-called binary differential encoding. This is characterized in that the presence of a pulse in an input pulse series brings about a change in the output pulse series, and due to the absence of a pulse in the input pulse series no change occurs in the output pulse series. For example, the use of binary differential encoding for a pulse series:

$$X_n = 00101100111101100$$

results in an output pulse series:

$$Y_n = 00110111010110111$$

It follows from this pulse series, that a "1" in $X_n$ produces alternatively a "0," "1" or "1, " "0 " in $Y_n$, but that a "0 " does not bring about a change in the output pulse series.

Differential encoding may generally be used, if the ratio between the delay period of the delay network 46 in the code converter and the pulse duration *T* of the pulses in the input signal, is equal to $2^p$, where *p* is some integer. For example, when binary differential encoding is used four times at a delay period of 4*T*, binary differential encoding is used eight times at a delay period of 8*T*, and so forth.

In addition to the sequence of pseudo-ternary code converters and amplitude control devices, shown in FIGS. 1, 9, and 12, it is possible to interchange this sequence without any restriction, or to incorporate the amplitude control devices in the pseudo-ternary code converters.

As regards the receiver shown in FIGS. 1, 7, and 14, the sequence of the full-wave rectifier and the level separator may be interchanged. The sequence given in the aforementioned Figures is preferred, however, because in the given sequence, the number of samplers is considerably smaller. Thus, when interchanging the sequence of level separator and full-wave rectifier in FIG. 7, six samplers instead of three would be required. It is alternatively possible to use amplitude filters instead of samplers, which filters only provide a pulse when the signal value is located above a given minimum and below a given maximum value.

What is claimed is:

1. A transmission system for the transmission of signals in a prescribed frequency band, comprising a transmitter having a multilevel coder, means applying to said multilevel coder a series of binary input-pulses occurring at instants coinciding with a series of equidistant clock pulses, said binary input pulses having the logical values "0" or "1," said series of binary input pulses being converted by said multilevel coder into a series of multilevel pulses each having any one of at least five different amplitude levels, said multilevel pulse series having a frequency spectrum with spectral zeros occurring at prescribed positions, a receiver having a multilevel decoder, means applying the received multilevel pulse series to said multilevel decoder for converting said multilevel pulse series into a series of binary pulses, said multilevel coder at a transmitter end thereof having a pulse group analyzer controlled by a clock pulse generator and having a number of parallel arranged output circuits connected to a linear combination device to produce a series of multilevel pulses, each of said multilevel pulses capable of assuming any one of a number of amplitude levels corresponding to one more than twice the number of output circuits, said output circuits being respectively provided with mutually equal pseudo-ternary code converters, and all the output circuits less one being respectively provided with an amplitude control device arranged in cascade with a relevant pseudo-ternary code converter, said pulse group analyzer, arranged for analyzing pulse groups consisting of a number of successively applied binary input pulses, means for applying to each one of said parallel arranged output circuits a separate series of binary output pulses having the logical values "0" or "1," said separate series representing the analyzed pulse groups and each composed of a succession of the logical values "0" and "1" such that at each instant, one and only one, output pulse of the analyzer has the logical value "1," while the number of pulses of each analyzed pulse series is smaller than the number of pulses of a pulse group, said multilevel decoder at a receiver end thereof comprises a cascade arrangement of a rectifier and a level separator, said cascade arrangement having a number of parallel arranged output terminals connected to input terminals of a pulse group shaper, both said level separator and said pulse group shaper being controlled by a local clock pulse generator, said cascade arrangement applying a separate series of binary pulses having the logical values "0" or "1" to each of the input terminals of said pulse group shaper, said last series of pulses having different amplitude levels of the multilevel signal, said pulse group shaper converting this last series of pulses into a successive number of pulse groups of binary pulses each corresponding with an analyzed pulse group, whereby the pulses of successive groups form the originally applied input pulse series.

2. A transmitter for the transmission of signals in a prescribed frequency band, said transmitter including a multilevel coder and means applying to said multilevel coder a series of binary input pulses occurring at instants coinciding with a series of equidistant clock pulses, said binary input pulses having the logical values "0" or "1," said series of binary input pulses being converted by said multilevel coder into a series of multilevel pulses each having any one of at least five different amplitude levels, said multilevel pulse series having a frequency spectrum with special zeros occurring at prescribed positions, said multilevel coder having a pulse group analyzer controlled by a clock pulse generator and having a number of parallel arranged output circuits connected to a linear combination device to produce a series of multilevel pulses which are each capable of assuming any one of a number of amplitude levels, corresponding to one more than twice the number of output circuits, said output circuits being respectively provided with mutually equal pseudo-ternary code converters and all the output circuits less one being respectively provided with an amplitude control device arranged in cascade with the relevant pseudo-ternary code converter, said pulse group analyzer arranged for analyzing pulse groups consisting of a number of successively applied binary input pulses, means for applying to each one of said parallel arranged output circuits a separate series of binary output pulses having the logical values "0" or "1," said separate series representing the analyzed pulse groups, and each composed of a succession of the logical values "0" and "1" such that at each instant, one and only one, output pulse of the analyzer has the logical value "1," while the number of pulses of each analyzed pulse series is smaller than the number of pulses of a pulse group.

3. A transmitter as claimed in claim 2, wherein the relationship represented by $k/n \leq {}^2\log(m+1)$ exists between an m number of output circuits of the pulse group analyzer, and the ratio of the number of binary pulses $k$ in a pulse group to be analyzed with the number of binary pulses n in the analyzed pulse series which are applied to the output circuits of the pulse group analyzer.

4. A transmitter as claimed in claim 2 for the transmission of a pulse series within which the pulses assume seven amplitude levels, wherein the pulse group analyzer includes three parallel output lines and analyzes pulse groups (0,0) ; (0,1) ; (1,1) ; and (1,0) of the binary pulse series and provides a binary pulse to not more than one of its output lines characteristic of each pulse group but taken for not more than three of these pulse groups.

5. A transmitter as claimed in claim 2, wherein the pseudo-ternary code converter includes a band-producing element which is constituted by a linear combination device to which a binary pulse series is applied directly and indirectly through a delay network.

6. A transmitter as claimed in claim 5, wherein the band-producing element is preceded by a modulo-2-combination device to which, on the one hand the pulse series occurring at the output line of the pulse group analyzer is applied, and to which on the other hand the pulse series which occurs at the output of the modulo-2-combination device is applied through the delay network.

7. A transmitter as claimed in claim 5, in which the ratio of a delay period of the delay network with a pulse duration of the pulses of the pulse series applied to the band-producing element is equal to an integral second power, wherein the band-producing element is preceded by a cascade arrangement of a number of change-of-state modulators which number is equal to the second power.

8. A transmitter as claimed in claim 5, characterized in that the band-producing element is formed by a digital filter consisting of a cascade arrangement of a number of shift register elements, whose contents are shifted by a control generator connected to the clock pulse inputs of the shift register elements, the shift register elements being connected through attenuation networks to a combination device, the attenuation networks being pairwise equal starting from exterior attenuation networks, while pulse signals of equal polarity are applied to mutually equal attenuation networks.

9. A transmitter as claimed in claim 8, wherein the shift register elements of the digital filter are connected through a second series of attenuation networks to a second combination device, the attenuation networks being pairwise equal starting from the exterior attenuation network while pulse signals of different polarity are applied to the mutually equal attenuation networks.

10. A transmitter as claimed in claim 9, wherein a same amplitude-frequency characteristic which suppresses a direct current term is generated at both combination devices by proportioning the two attenuation networks, said combination devices being connected to individual modulators to which carriers are also applied which are mutually shifted over $\pi/2$, said carriers originate from a common carrier oscillator, and outputs of the modulators are connected to a second combination device.

11. A transmitter as claimed in claim 9, wherein the combination device is connected to a modulator to which also a carrier oscillator is connected.

12. A receiver suitable for use in a transmission system, said receiver including a multilevel decoder and means for applying a received multilevel pulse series to said multilevel decoder for converting said multilevel pulse series into a series of binary pulses, said multilevel decoder at the receiver end thereof, comprising a cascade arrangement of a rectifier and a level separator, said cascade arrangement having a number of parallel arranged output terminals connected to input terminals of a pulse group shaper, both said level separator and said pulse group shaper being controlled by a local clock pulse generator, said cascade arrangement applying a separate series of binary pulses having the logical values "0" or "1" to each of the input terminals of said pulse group shaper, said series representing the different amplitude levels of the multilevel signal are converted by said pulse group shaper into successive pulse groups of a number of binary pulses each corresponding with an analyzed pulse group, whereby the pulses of successive groups form the originally applied input pulse series.

13. A receiver as claimed in claim 12, wherein the level separator includes three parallel output lines in which each output line is constituted by an output line of a sampler to which the information signals obtained after demodulation are applied, a sampling signal being additionally applied to the samplers, which signal originates from a local clock pulse generator, while a reference voltage source is connected to each sampler.

14. A receiver as claimed in claim 13, for the reception of pulse signals within which the pulses assume seven levels, wherein the pulse group shaper is provided with three parallel input lines and which converts pulses occurring therein into pulse groups (0,0) ; (0,1) ; (1,1) ; and (1,0).

15. A receiver as claimed in claim 14, wherein one of the input lines of the pulse group shaper is applied at one end thereof to an OR-gate and at another end thereof to two selection gates, and a second input line is applied to both selection gates, a third input line being applied to one of the selection gates, an output of one of the selection gates being applied directly at one end thereof and through a delay network at another end thereof, to the OR-gate, an output of the other selection gate is likewise connected to the OR-gate through a delay network.

* * * * *